E. U. LAGUIONIE.
PLAN OR MAP IN DUPLICATE AND APPLIED OVER EACH OTHER RECTO-VERSO.
APPLICATION FILED MAR. 7, 1918.
1,286,031.                                    Patented Nov. 26, 1918.
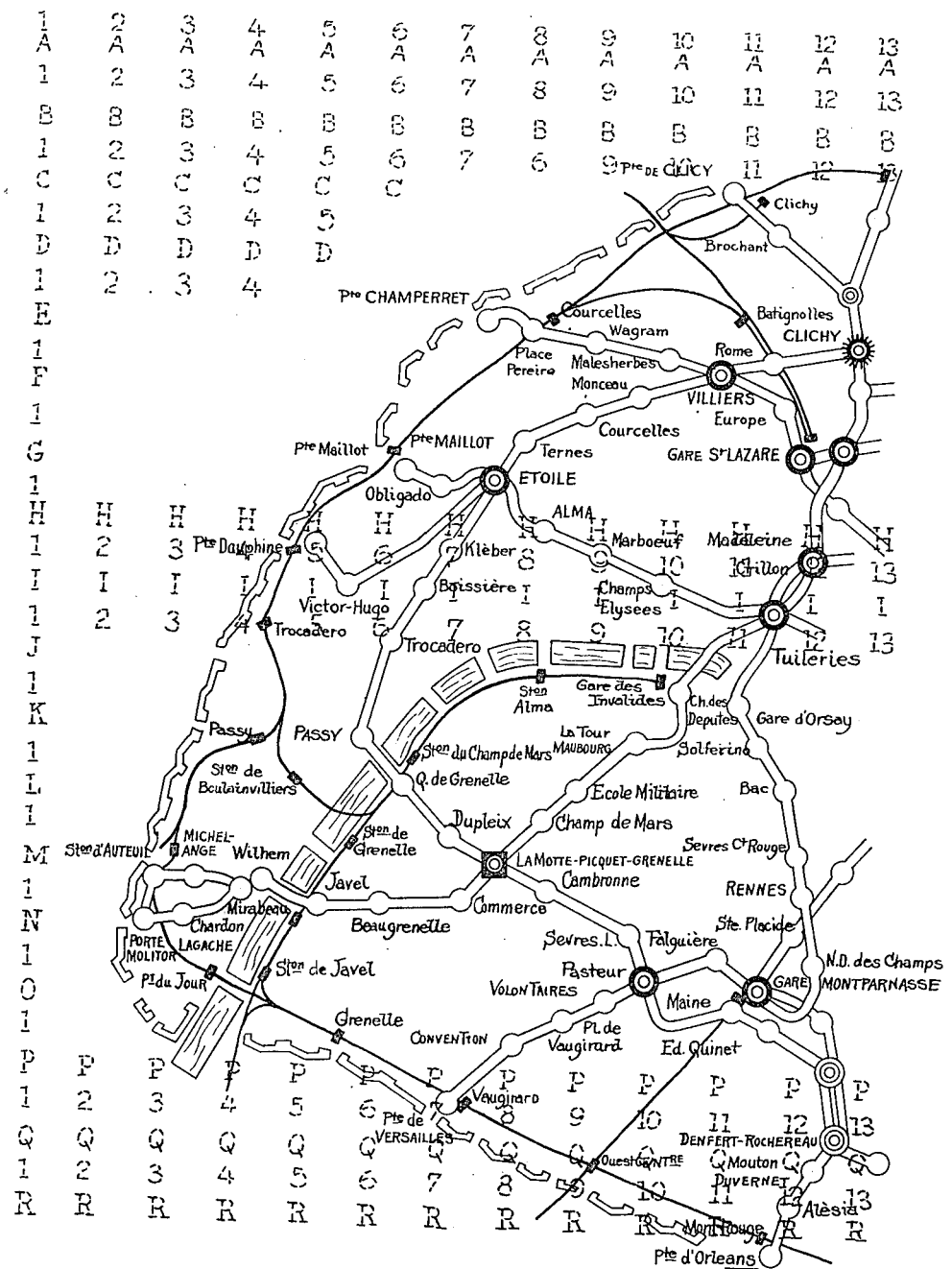

UNITED STATES PATENT OFFICE.

EDMOND ULYSSE LAGUIONIE, OF PARIS, FRANCE.

PLAN OR MAP IN DUPLICATE AND APPLIED OVER EACH OTHER RECTO-VERSO.

1,286,031. Specification of Letters Patent. Patented Nov. 26, 1918.

Application filed March 7, 1918. Serial No. 221,045.

*To all whom it may concern:*

Be it known that I, EDMOND ULYSSE LAGUIONIE, a citizen of the Republic of France, residing at Paris, France, No. 22 Boulevard Voltaire, have invented certain new and useful Improvements in Plans or Maps in Duplicate and Applied Over Each Other Recto-Verso; and I do declare the following to be a full, clear, and exact description of the invention, such as will enable others skilled in the art to which it appertains to make and use the same.

This invention has for its object permitting to read on a single side of a map or plan, details concerning two maps or plans under the same scale in order that when looking at same by transparency, both plans join their details and offer the aspect of a single entire map printed only on one side and this feature will allow to find readily a point.

The drawing is a diagrammatic representation of the map.

The system consists in printing on a side the required details of the plan, in black or other color on the recto, and on the other side, or verso, other details will be printed inversely and also in black or colors, under the same scale, in order that a coincidence may be obtained according to some guides of reference.

*Example of application.*—If taking for instance a plan for auto-cars or trams of a city drawn in the streets, or at some points which are very overcharged it is impossible of reading or following the lines without spending a great attention or being necessary to use a magnifying-glass, but if the lines of auto-cars or trams are drawn only on a side, this last will remain very clear. On the other side then there only will be drawn the streets, monuments, etc., and this last side will also remain very clear.

*For finding a point.*—It is well known how difficult it is for finding very quickly a point upon a map or plan.

This system by using transparency permits of overcoming said difficulties and in this manner a device is obtained which constitutes a means of seeing clearly and finding instantaneously any point looked for upon a map or a plan with the key table. This table comprises:

1°.—A line of numerals which is parallel to the top frame: 1. 2. 3. 4. 5. 6. 7. 8. 9. 10. 11. 12, etc.

2°.—Beneath, at the required distance and varying according to requirements, a second line of same numerals is provided, then a third, a fourth, etc., to the bottom of the sheet.

These numerals are disposed under each other in order forming columns in straight lines or curves as occasion requires.

3°.—Between two horizontal lines of numerals there will be written a series of alphabetical letters A. B. C. D., etc., or any other combination of letters or numerals or signs of same kind or marks and without being able to become confused. In this way there will be obtained the letter A between the two first horizontal lines of numerals; the letter B between the second and third horizontal lines of numerals, etc. The alphabet or other signs will be furthermore reproduced down to the bottom of the sheet between each line of numerals and always in the same order. It results that a key table will be obtained as the one shown hereafter and which will reach unlimited numbers and the required sizes according to the plan:

```
1 2 3 4 5 6 7 8 9 10 11 12 13 ...
A A A A A A A A A A .. ..
1 2 3 4 5 6 7 8 9 10 11 12 13 ...
B B B B B B B B B B .. ..
1 2 3 4 5 6 7 8 9 10 11 12 13 ...
C C C C C C C C C C .. ..
1 2 3 4 5 6 7 8 9 10 11 12 13 ...
D D D D D D D D D D .. ..
```

This table being printed on the back of the map, as above stated, preferably in color and inversely, same can be seen on looking by transparency at a plan or map. Thus it can be seen which are the points corresponding to the letters or numerals which are printed on the back and for finding again these points, it will be sufficient to follow with the eyes the first line of numerals to the number which is indicated and to go down throughout the column formed by this number until the letter which gives the point. It is also possible to manage inversely in taking the numerals as guides of reference.

It is necessary to establish an index by means of alphabetical letters or signs, which will be printed on the edges of the plan or map or constituting a separate small book, each designation to be found being followed by the corresponding indications printed on the verso of the map as above indicated.

This table can also be printed upon a separate transparent sheet for instance, and to be applied when using same, upon the map or plan.

For maps to be hung on walls or having a big size, this key table can be printed directly on the ground of the plan instead of the back, with a pale color which can only be seen when looking at very near and giving an appearance of transparency. This construction results in the advantage that lines may be followed with the eye until the point looked for is found without causing any subsequent confusion.

The key can also be printed, so as to have the same in duplicate, in the form of an index upon a separate sheet. It is sufficient to print the first line of numerals on the top edge, for instance, and the letters on the side.

Then as base will be taken an edge of the printing of the plan or map, the letter taken as reference will be applied thereon and the point will be found under the corresponding number taken as reference. A line of inverted numerals can also be printed at the bottom and at the back of the plan and the letters on the side of the plan. For finding a point, then the edge bearing the line of numerals has to be turned over and to coincide with the letter, it results that the point is found at the indicated number.

What I claim is:

1. A map including a sheet of semi-opaque material, matter printed upon both sides of such sheet, such matter representing the same localities.

2. A map including a sheet of semi-opaque material with a representation of a certain locality printed upon one side and reference letters upon the other side, each of said references corresponding to a certain locality, whereby any desired point upon said map may be located by holding such sheet against the light by reason of said references appearing through the face of the map.

In testimony whereof I have hereunto set my hand, in presence of two subscribing witnesses.

EDMOND ULYSSE LAGUIONIE.

Witnesses:
VICTOR PRÉVOST,
CHAS. P. PRESSLY.